(12) United States Patent
Gupta et al.

(10) Patent No.: US 11,265,301 B1
(45) Date of Patent: Mar. 1, 2022

(54) DISTRIBUTION OF SECURITY KEYS

(71) Applicant: Amazon Technologies, Inc., Seattle, WA (US)

(72) Inventors: Sanjeev Gupta, Fremont, CA (US); Frederick David Sinn, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 259 days.

(21) Appl. No.: 16/708,273

(22) Filed: Dec. 9, 2019

(51) Int. Cl.
*H04L 29/06* (2006.01)

(52) U.S. Cl.
CPC ........ *H04L 63/062* (2013.01); *H04L 63/0428* (2013.01); *H04L 63/061* (2013.01); *H04L 63/067* (2013.01); *H04L 63/08* (2013.01)

(58) Field of Classification Search
CPC ..... H04L 63/062; H04L 63/067; H04L 63/08; H04L 63/0428; H04L 63/061
See application file for complete search history.

(56) References Cited

U.S. PATENT DOCUMENTS

| | | | | |
|---|---|---|---|---|
| 6,154,782 A * | 11/2000 | Kawaguchi | ......... | H04L 12/1822 709/203 |
| 7,222,152 B1 * | 5/2007 | Thompson | .............. | H04L 67/00 709/202 |
| 8,713,311 B1 * | 4/2014 | Roskind | .............. | H04L 63/0428 713/161 |
| 10,158,651 B1 * | 12/2018 | Nimry | ................. | H04L 63/0435 |
| 11,146,952 B2 * | 10/2021 | Sheng | .................... | H04L 63/162 |
| 2002/0019871 A1 * | 2/2002 | Asamoto | ............. | H04L 12/5692 709/224 |
| 2002/0099727 A1 * | 7/2002 | Kadyk | ................ | H04L 67/1095 |
| 2003/0172144 A1 * | 9/2003 | Henry | ................ | H04L 61/2015 709/223 |
| 2004/0103373 A1 * | 5/2004 | Wei | ........................ | G06F 40/143 715/234 |
| 2005/0063541 A1 * | 3/2005 | Candelore | .......... | H04N 21/8355 380/239 |
| 2006/0085842 A1 * | 4/2006 | Liu | ........................ | H04L 9/3247 726/4 |
| 2008/0285756 A1 * | 11/2008 | Chuprov | ............... | H04L 9/0838 380/277 |
| 2008/0313518 A1 * | 12/2008 | Naoe | ........................ | H04L 1/16 714/748 |
| 2009/0237300 A1 * | 9/2009 | Han | ........................ | G01S 19/05 342/357.64 |

(Continued)

*Primary Examiner* — Aravind K Moorthy
(74) *Attorney, Agent, or Firm* — Hogan Lovells US LLP (57) ABSTRACT

Technology is described for using a first key to secure communications over a network link between a server and a client. A second key may be identified. A first message may indicate the server may receive data from the client using the second key but not to transmit data to the client using the second key, and that the first key is valid for sending and receiving data between the server and the client. A second message may indicate that the client may send and receive data with the server using the second key, and that the client may receive data from the server using the first key but not transmit data to the server using the first key. A third message may indicate that the server may send and receive data with the client using the second key, and that the first key is invalid for sending and receiving data between the server and the client.

20 Claims, 9 Drawing Sheets

(56) References Cited

U.S. PATENT DOCUMENTS

| | | | |
|---|---|---|---|
| 2010/0042836 A1* | 2/2010 | Shon | H04L 63/08 713/168 |
| 2010/0174906 A1* | 7/2010 | Li | H04L 9/083 713/168 |
| 2010/0284536 A1* | 11/2010 | Brown | H04L 63/062 380/273 |
| 2011/0047288 A1* | 2/2011 | Sakano | H04W 48/18 709/236 |
| 2011/0154036 A1* | 6/2011 | Wong | H04W 4/12 713/168 |
| 2012/0011576 A1* | 1/2012 | Guan | H04W 12/062 726/7 |
| 2012/0204031 A1* | 8/2012 | Harkins | H04L 9/321 713/168 |
| 2012/0210167 A1* | 8/2012 | Katayama | H04L 1/1838 714/18 |
| 2013/0291002 A1* | 10/2013 | Rothschild | H04N 21/6581 725/25 |
| 2014/0040182 A1* | 2/2014 | Gilder | G06Q 40/12 707/602 |
| 2014/0233738 A1* | 8/2014 | Chunduri | H04L 45/00 380/277 |
| 2014/0237523 A1* | 8/2014 | Onishi | H04N 21/6175 725/88 |
| 2015/0295987 A1* | 10/2015 | Finocchiaro | G06F 16/9566 709/203 |
| 2016/0337354 A1* | 11/2016 | Smadja | H04W 4/70 |
| 2017/0019458 A1* | 1/2017 | Perahia | H04L 69/22 |
| 2017/0331623 A1* | 11/2017 | Fu | H04L 9/0852 |
| 2018/0124023 A1* | 5/2018 | Qi | H04L 9/006 |
| 2018/0278595 A1* | 9/2018 | Zhang | H04L 9/0822 |
| 2018/0332149 A1* | 11/2018 | Vyas | H04L 69/329 |
| 2019/0052482 A1* | 2/2019 | Yang | H04L 63/0428 |
| 2019/0130052 A1* | 5/2019 | Ohyama | G06F 30/00 |
| 2019/0138877 A1* | 5/2019 | Li | G06Q 10/10 |
| 2019/0191307 A1* | 6/2019 | Sheng | H04L 9/0838 |
| 2019/0208417 A1* | 7/2019 | Kang | H04W 80/02 |

* cited by examiner

DISTRIBUTION OF SECURITY KEYS

BACKGROUND

Communication links connecting servers, devices or nodes in a network may be secured to provide secure communications between the devices or nodes. The communication links may include wired links, such as Ethernet links, or the communication links may be wireless links. The communication links may be secured to identify and prevent security threats, such as denial of service, intrusion, man-in-the-middle attacks, masquerading, passive wiretapping, playback attacks, etc. As an example, traffic traversing a communication link may be secured through the use of data integrity checks and/or encryption.

In one example, security keys may be periodically exchanged and verified between two devices or nodes to provide encryption and ensure link security. The security keys may be exchanged at a periodic interval to maintain security for the communication link. The security keys may include a first security key that secures data plane traffic, as well as a second security key that secures control plane traffic. The security keys may be user-configured to be dynamically generated, depending on a security mode used to enable the link security. In one example, after the security keys are established, traffic traversing the communication link may be secured using data integrity checks and/or encryption.

DETAILED DESCRIPTION

Technologies are described for distributing security keys for use in securing data communicated on a data link between a server and a client in a data center. The server and the client may exchange signaling to transition from use of a first security key (or old security key) to a second security key (or new security key). The second security key may be distributed from the server to the client in a periodic manner (e.g., every 30 seconds to one minute). After the second security key is provided to the client, the second security key may be used to secure data communicated on the data link between the server and the client. In addition, the signaling exchanged between the client and the server may cause the first security key to be gradually phased out after the second security key is established for use between the server and the client. After the signaling is completed, the second security key may be used and the first security key may not be used to secure data communicated between the server and the client.

In one example, the server and the client may be a Media Access Control Security (MACsec) Key Agreement (MKA) server and an MKA client, respectively, in accordance with a MACsec protocol. In other words, the MKA server may be a device that performs a server role for MKA, and the MKA client may be a device that performs a client role for MKA. In another example, the security keys communicated between the server and the client may be secure association keys (SAKs). In a specific example, the server may be a networking device in the data center, and the client may be a compute server in the data center. In another specific example, the server may be a virtualized networking device and the client may be a virtualized compute server. Further, the data link between the server and the client may be a high throughput wired data link (e.g., an Ethernet link) between the server and the client in the data center or an Ethernet link on a virtualized overlay network on a physical substrate network.

In one example, the server and the client may initially communicate using the first security key. For example, data communication between the server and the client may be encrypted or otherwise secured using the first security key. The first security key may have been previously established between the server and the client. After a duration of time (e.g., 30 seconds to one minute), the server may identify or generate a second security key. The second security key may be generated or identified while the first security key is being used at the server. The generation of the second security key may be triggered automatically based on the duration of time.

In one example, the server may transmit a first message to the client including the second security key. The first message may indicate that the server is configured to receive data from the client using the second security key but not to transmit data to the client using the second security key. Further, the first message may indicate that the server can transmit data to and receive data from the client using the first security key. In other words, the first message may indicate that the second security key is valid for reception but not transmission of data, but the first security key is still valid for both transmission and reception of data.

The client may transmit a second message to the server indicating that the client can transmit data to and receive data from the server using the second security key. Further, the second message may indicate that the client can receive data from the server using the first security key but not transmit data to the server using the first security key. In other words, the second message may indicate that the second security key is not valid for both reception and transmission of data, whereas the first security key is valid for reception but not transmission of data. The first security key may continue to be used to receive data from the server because some packets that were secured using the first security key may be in-flight between the server and the client.

The server may transmit a third message to the client indicating that the server can transmit data to and receive data from the client using the second security key. Further, the third message may indicate that the server will not transmit data to and receive data from the client using the first security key. In other words, the third message may indicate that the first security key is now invalid for both reception and transmission of data, and only the second security key can be used for reception and transmission of data between the server and the client.

The signaling between the server and the client to transition from use of the first security key to use of the second security key may be reduced based on the server and the client operating in a two-device communication channel. For example, due to the server and the client operating in the two-device communication channel, the server may assume that the client is using the second security key and not using the first security key based on signaling transmitted from the server. Thus, the client may not transmit acknowledgement messages to the server, thereby reducing signaling between the client and the server as compared to where the server would operate with multiple clients in a multi-device communication channel. The presence of the two-device communication channel may result in the reduced amount of signaling needed to transition from the first security key to the second security key.

Figure 1:
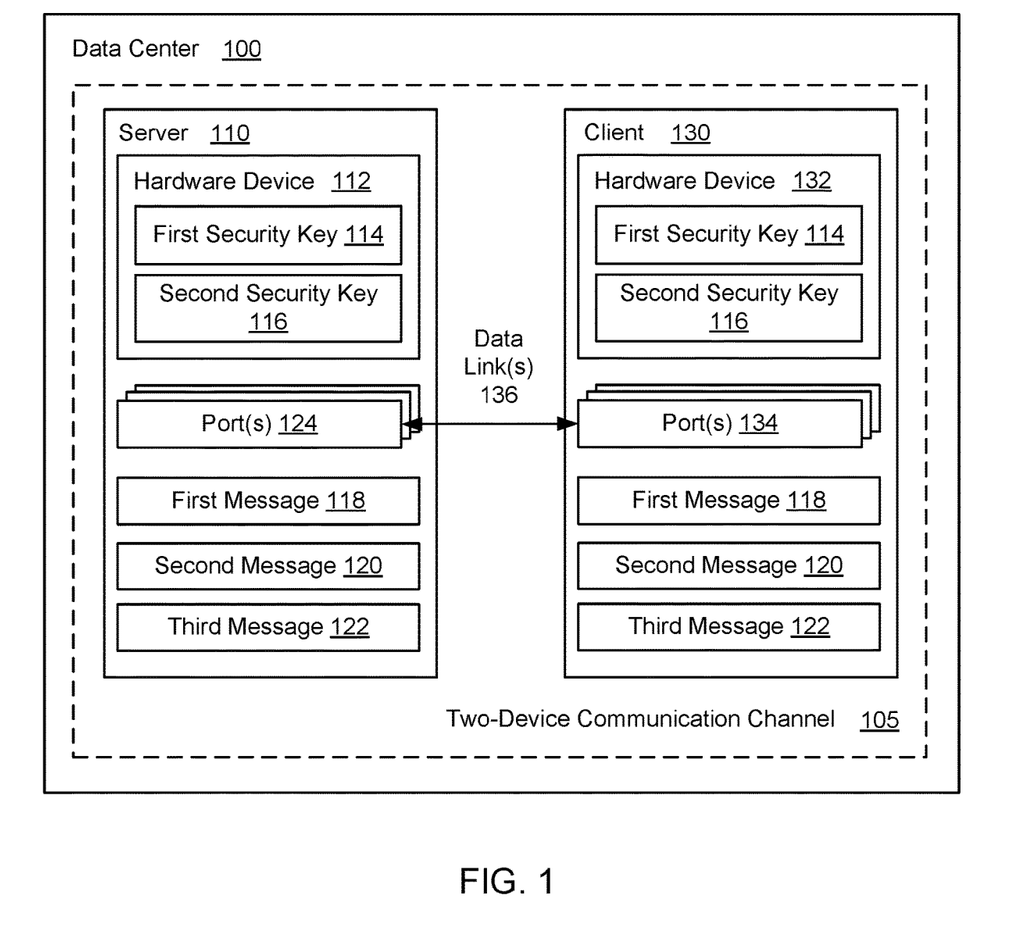
FIG. 1 illustrates a system and related operations for switching from a first security key to a second security key to secure a data link between a server and a client according to an example of the present technology.

FIG. 1 illustrates an example of a system and related operations for switching from a first security key 114 (or old security key) to a second security key 116 (or new security key) to secure a data link 136 between a server 110 and a client 130 in a data center 100. The server 110 may be a networking device in the data center 100, and the client 130 may be a compute server in the data center 100. Alternatively, the server and client may be peer level servers. The server 110 and the client 130 may operate in a two-device communication channel 105 in the data center 100, as opposed to a multi-device communication channel that includes a server in communication with multiple clients. The first and second security keys 114, 116 may be used for security of the data link 136 between the server 110 and the client 130 in the two-device communication channel 105. Further, the data link 136 between the server 110 and the client 130 may be a high throughput wired data link, such as a 100 gigabit or higher wired Ethernet link.

In one example, the server 110 may be a Media Access Control Security (MACsec) Key Agreement (MKA) server and the client 130 may be an MKA client, respectively, in accordance with a MACsec protocol. In another example, the first and second security keys 114, 116 communicated between the server 110 and the client 130 may be secure association keys (SAKs) in accordance with a MACsec protocol. As an example, the SAKs may be security keys that are symmetric or asymmetric encryption keys randomly generated at periodic intervals and used to secure data communicated between the server 110 and the client 130.

In one example, MACsec is an 802.1AE Institute of Electrical and Electronics Engineers (IEEE) industry-standard security technology that provides secure communication for traffic on an Ethernet link. MACsec may provide point-to-point security on Ethernet links between connected nodes, and may be capable of identifying and preventing various types of security threats, such as denial of service, intrusion, man-in-the-middle attacks, masquerading, passive wiretapping, playback attacks, etc. After MACsec is enabled on a point-to-point Ethernet link, traffic traversing the link may be MACsec-secured through the use of data integrity checks and/or encryption.

In one example, MACsec may be used to secure an Ethernet link for traffic, including frames from the Link Layer Discovery Protocol (LLDP), Link Aggregation Control Protocol (LACP), Dynamic Host Configuration Protocol (DHCP), Address Resolution Protocol (ARP), and other protocols that are not typically secured on an Ethernet link because of limitations with other security solutions. MACsec may also be used in combination with other security protocols such as IP Security (IPsec) and Secure Sockets Layer (SSL) to provide end-to-end network security.

In one example, MACsec can provide industry-standard security through the use of secured point-to-point Ethernet links. The point-to-point links may be secured after matching security keys are exchanged and verified between interfaces at each end of the point-to-point Ethernet link. The security keys may be user-configured and pre-loaded prior to use or may be generated dynamically, depending on a security mode used to enable MACsec. For example, for one security mode, two security keys may be used to secure the point-to-point Ethernet link. The two security keys may include a connectivity association key (CAK) to secure control plane traffic and a randomly-generated secure association key (SAK) to secure data plane traffic.

Returning to FIG. 1, the server 110 may include N ports 124 and the client 130 may include N ports 134, where N is a positive integer. The data link(s) 136 between the server 110 and the client 130 may be between a port 124 of the server 110 and a port 134 of the client 130. Thus, the data link 136 between the server 110 and the client 130 may be a port-to-port data link. Security channels may be on a port-to-port link basis. Thus, the first and second security keys 114, 116 may be applicable to the port-to-port data link 136 between the server 110 and the client 130, and security of the port-to-port data link(s) 136 may be independent of security of other port-to-port links at the server 110.

As a non-limiting example, the server 110 may include 16 ports and the client 130 may include 16 ports. In one non-limiting configuration, the 16 ports of the server 110 may be connected to the 16 ports of the client 130 (e.g., a first port of the server 110 may be connected to a first port of the client 130, a second port of the server 110 may be connected to a second port of the client 130, and so on). In another non-limiting configuration, the 16 ports of the server 110 may be connected to 16 ports of up to 16 clients (e.g., a first port of the server 110 may be connected to a port of a first client, a second port of the server 110 may be connected to a port of a second client, and so on). Regardless of the configuration, security for one port-to-port data link between the server 110 and the client 130 may be independent of security for other port-to-port data links between the server 110 and client(s) 130.

In one example, the server 110 and the client 130 may perform an authentication process in order to communicate with each other. For example, the server 110 and the client 130 may be authenticated using MKA to perform a key distribution. The server 110 and the client 130 may be authenticated directly with each other, or through an authentication server which may be used for authentication purposes.

After authentication has been completed, the server 110 may generate the first security key 114 and send the first security key 114 to the client 130. The server 110 and the client 130 may communicate data over the data link 136 using the first security key 114. For example, the server 110 may transmit data and receive data using the first security key 114, and the client 130 may transmit data and receive data using the first security key 114. The first security key 114 may have been previously established between the server 110 and the client 130. The first security key 114 may be programmed or stored onto a hardware device 112 (e.g., a memory device) of the server 110, as well as a hardware device 132 of the client 130. The first security key 114 may be programmed at the server 110 and the client 130 for use in both the transmission of data and the reception of data between the server 110 and the client 130.

The first security key 114 may be valid for a certain period of time (e.g., 30 seconds to one minute), at which point the server 110 may transition to not using the first security key 114. For example, after the certain period of time, the server 110 may identify or generate the second security key 116. The server 110 may identify or generate the second security key 116 while the first security key 114 is being used at the server 110. Since the second security key 116 may be generated later in time as compared to the first security key 114, the second security key 116 may be considered a new security key, whereas the first security key 114 may be considered an old security key. The server 110 may program or store the second security key 116 on the hardware device 112. Initially, the second security key 116 may be programmed at the server 110 for use in the reception of data at the server 110, but not for use in the transmission of data from the server 110.

In one example, the hardware device 112 of the server 110 and the hardware device 132 of the client 130 may support a limited number of programmed keys at a given time. As an example, the hardware devices 112, 132 may support up to four security keys at a given time. In this example of switching between the first security key 114 and the second security key 116, the hardware devices 112, 132 may support the use of both security keys at a given time. In another example, the hardware device 112 of the server 110 and the hardware device 132 of the client 130 may be specific to the data link 136. For example, each port-to-port data link between the server 110 and the client 130 may be associated with separate hardware (e.g., an integrated circuit, programmable chip, or circuit board or hardware networking board) to be used for data integrity checks and/or encryption. In a further example, the hardware device 112 may be programmed using a common library by an application processor on the server 110, and the hardware device 132 may be programmed using a common library by an application processor on the client 130.

In one example, after the second security key 116 is available for use, the server 110 may exchange a series of messages with the client 130 in order to transition from use of the first security key 114 to the second security key 116. The signaling exchanged between the server 110 and the client 130 may cause the first security key 114 to be phased out in steps after the second security key 116 is established for use between the server 110 and the client 130. After the signaling is completed, the second security key 116 may be used and the first security key 114 may not be used to secure data communicated between the server 110 and the client 130.

In one example, the server 110 may transmit a first message 118 to the client 130. The first message 118 may indicate that the server 110 is configured to receive data from the client 130 using the second security key 116 but not to transmit data to the client 130 using the second security key 116. By programming the second security key 116 onto the hardware device 112 of the server 110 after the second security key 116 was generated, the server 110 may be able to transmit the first message 118 indicating that the second security key 116 is useable for the reception of data at the server 110. Further, the first message 118 may indicate that the first security key 114 is valid for communicating data between the server 110 and the client 130.

The client 130 may receive the first message 118 which includes the second security key 116 from the server 110. The client 130 may program the second security key 116 onto the hardware device 132 of the client 130. The second security key 116 may be programmed at the client 130 for use in both the transmission of data and the reception of data between the client 130 and the server 110. In addition, the client 130 may stop using the first security key 114 for the transmission of data from the client 130, but initially not for the reception of data at the client 130.

In one example, the client 130 may transmit a second message 120 to the server 110. The second message 120 may indicate that the client 130 is configured to communicate data with the server 110 using the second security key 116 (i.e., the second security key 116 may be used for both the transmission of data and the reception of data at the client 130). Further, the second message 120 may indicate that the client 130 is configured to receive data from the server 110 using the first security key 114 but not transmit data to the server 110 using the first security key 114. The first security key 114 may continue to be used at the client 130 to receive data from the server 110 because some packets that were secured using the first security key 114 may be in-flight or in-transit between the server 110 and the client 130. Therefore, at this point, the client 130 may continue to support the receipt of data using the first security key 114.

The server 110 may receive the second message 120 from the client 130. After receiving the second message 120, the server 110 may program the second security key 116 onto the hardware device 112 for use with the transmission of data from the server 110. At this point, the second security key 116 may be programmed at the server 110 for use in both the transmission of data and the reception of data between the client 130 and the server 110. In addition, the server 110 may remove (and optionally erase) the first security key 114 from the hardware device 112 with respect to both the transmission of data and the reception of data between the server 110 and the client 130. Thus, at this point, the second security key 116 may be programmed for use in both the transmission of data and the reception of data at the server 110, and the first security key 114 may be invalid at the server 110 for the transmission of data and the reception of data.

In one example, the server 110 may transmit a third message 122 to the client 130. The third message 122 may indicate that the server 110 is now communicating data with the client 130 using the second security key 116 (i.e., the second security key 116 may be used for both the transmission of data and the reception of data at the server 110), and that the first security key 114 is invalid for communicating data between the server 110 and the client 130.

The client 130 may receive the third message 122 from the server 110, and the client 130 may stop using the first security key 114 for the reception of data from the client 130. Thus, at this point, the second security key 116 may be programmed for use in both the transmission of data and the reception of data at the client 130, and the first security key 114 may be invalid at the client 130 for both the transmission of data and the reception of data at the client 130. When the first security key 114 is invalid for both the transmission and reception of data, the first security key 114 may be removed or erased from the hardware device 132 of the client 130.

In one example, the first message 118, the second message 120 and the third message 122 may be retransmitted in accordance with a retransmit mechanism when the first message 118, the second message 120 and/or the third message 122 are lost in transit between the server 110 and the client 130. For example, if no response or acknowledgement is received within a certain duration of time, a message may be retransmitted.

In one example, the client 130 may optionally transmit a fourth message to the server 110. The fourth message may be an optional confirmation message that confirms the client 130 is not using the first security key 114 to transmit and receive data to and from the server 110. In one example, the fourth message may be optional, as the server 110 may assume that the client 130 is no longer using the first security key 114 to transmit and receive data to and from the server 110, based on the delivery of the third message 122 to the client 130.

In one configuration, up to two security keys may be supported at a given time. For example, the first security key 114 may initially be supported, but then the second security key 116 may be supported. During the transition between the first security key 114 and the second security key 116, both the first and second security keys 114, 116 may be supported, but after the transition is completed, the second security key 116 may no longer be supported.

In this technology, the signaling (or exchange of messages) between the server 110 and the client 130 may cause the server 110 and the client 130 to transition from use of the first security key 114 to use of the second security key 116. The server 110 and the client 130 may transition from use of the first security key 114 to use of the second security key 116 using a reduced amount of signaling based on the server 110 and the client 130 operating in the two-device communication channel 105. For example, when the server 110 and the client 130 operate in the two-device communication channel 105, the server 110 may assume that the client 130 is using the second security key 116 and not using the first security key 114 based on the first message 118 and the third message 122 transmitted from the server 110. In addition, the client 130 may optionally avoid transmitting acknowledgement messages to the server 110 thereby saving on signaling messages. Therefore, the presence of the two-device communication channel 105 may result in the reduced amount of signaling used to transition from the first security key 114 to the second security key 116.

In one example, the reduced signaling to transition from the first security key 114 to the second security key 116 (or converge to an agreement of using the second security key 116) may enable the server 110 and the client 130 to switch between the first security key 114 to the second security key 116 in a reduced time interval. An ability to reduce the time interval for switching between security keys may allow for increased on the data link 136.

As a non-limiting example, the reduced signaling may result in the transition time from the first security key 114 to the second security key 116 being reduced from one minute to 30 seconds. As a result, the server 110 and the client 130 can rotate the security keys (e.g., begin using a new security key and stop using an old security key) every 30 seconds.

In contrast, in the past, a server would communicate with multiple clients in a multi-device communication environment. In this past solution, a security key distribution would occur between the server and each of the clients in the multi-device communication environment. In other words, one security key would be used between the server and the multiple clients, and switching to a new security key would involve signaling between the server and each of the multiple clients. For example, the server would communicate with a first client, and then a second client, and so on. In this past solution, during the security key distribution, each client would send a response (e.g., an acknowledgement) to the server at various points of the process. For example, each client would send a response indicating that the client has accepted a new security key. The server would wait until a response was received from each client before proceeding to a next stage of the process (e.g., transmitting the new security key). In cases when a certain client was delayed in responding to the server, the delay would affect all of the clients, as the server would be prevented from proceeding to the next stage without receiving responses from each of the multiple clients. Further, since the server and the multiple clients operated in the multi-device communication environment, the server could make no assumptions that the client was performing a certain task (e.g., transmitting with the new security key) or had completed a certain task (e.g., removing an old security key) without an explicit indication or response from the clients. Therefore, in the past, key distribution in the multi-device communication environment would involve increased signaling and thereby additional time.

In the present technology, the server and the client may operate in a two-device communication channel or two-device communication system. As a result, the server may assume that the client will perform or complete a certain task in response to signaling or messaging from the server, without receiving a response or acknowledgement from the client. Further, since the server and the client may operate in the two-device communication channel, the server may not wait to receive a response from multiple clients, thereby saving time in transition between security keys.

Figure 2:
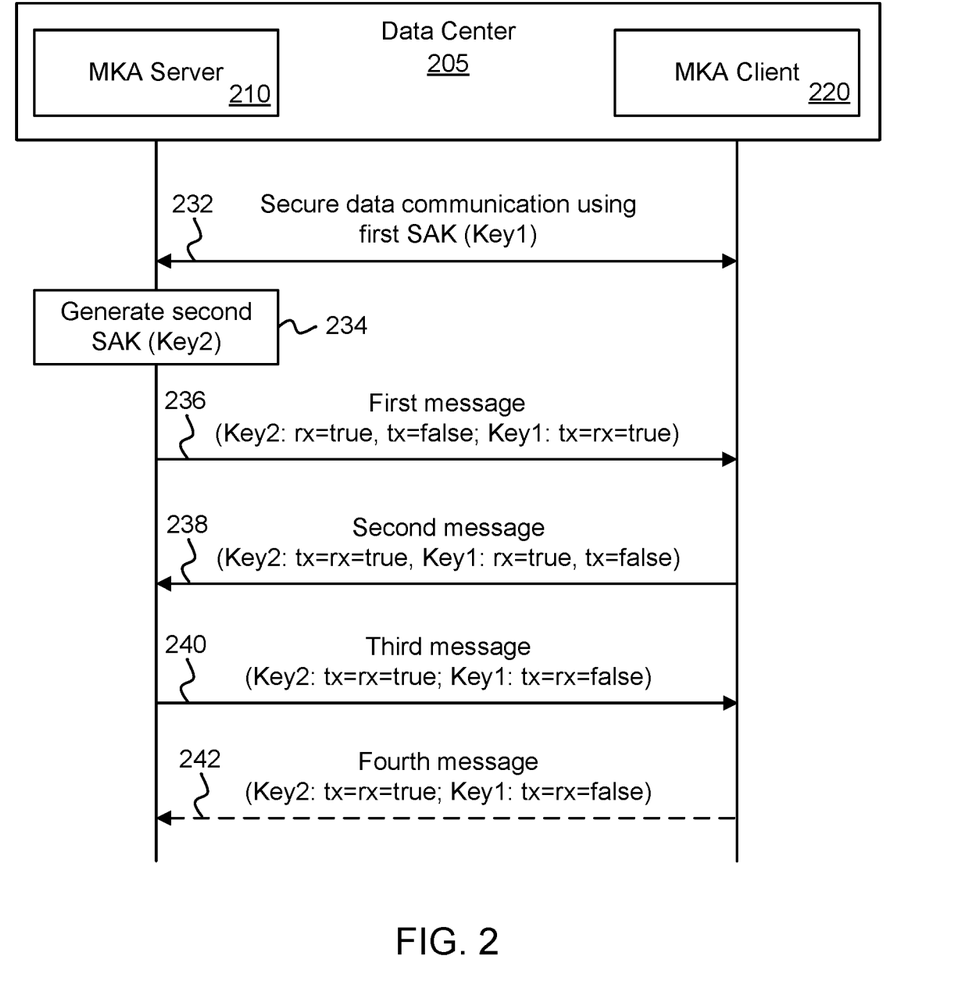
FIG. 2 illustrates signaling between a Media Access Control Security (MACsec) Key Agreement (MKA) server and an MKA client to enable switching from a first secure association key (SAK) to a second SAK to secure a data link between the MKA server and the MKA client according to an example of the present technology.

FIG. 2 illustrates an example of signaling between an MKA server 210 and an MKA client 220 in a data center 205 to switch from a first SAK (Key1) to a second SAK (Key2) to secure a data link between the MKA server 210 and the MKA client 220. In an initial action 232, the MKA server 210 and the MKA client 220 may be performing secure data transfer, as communicated between the MKA server 210 and the MKA client 220 using the first SAK. For example, the MKA server 210 may transmit data to the MKA client 220 and receive data from the MKA client 220 using the first SAK. Similarly, the MKA client 220 may transmit data to the MKA server 210 and receive data from the MKA server 210 using the first SAK.

In another action 234, the MKA server 210 may generate or identify the second SAK. For example, the MKA server 210 may generate or identify the second SAK after the first SAK has been in use for a certain duration of time.

In a further operation 236, the MKA server 210 may transmit a first message to the MKA client 220. The first message may indicate that the MKA server 210 is able to receive (Rx) data from the MKA client 220 using the second SAK, but that the MKA server 210 is currently unable to transmit (Tx) data to the MKA client 220 using the second SAK. Further, the first message may indicate that the MKA server 210 is currently able to transmit data to the MKA client 220 and receive data from the MKA client 220 using the first SAK. In other words, the first message may indicate that the first SAK is true or valid for both the transmit and receive directions, the second SAK is true or valid for the receive direction, and the second SAK is false or invalid for the transmit direction.

In yet another action 238, the MKA client 220 may transmit a second message to the MKA server 210. The second message may indicate that the MKA client 220 is able to transmit data to the MKA server 210 and receive data from the MKA server 210 using the second SAK. Further, the second message may indicate that the MKA client 220 is able to receive data from the MKA server 210 but is unable to transmit data to the MKA server 210. More specifically, the second message may indicate that the first SAK is true or valid for the receive direction, the first SAK is false or invalid for the transmit direction, and the second SAK is true or valid for both the transmit and receive directions.

In one operation 240, the MKA server 210 may transmit a third message to the MKA client 220. The third message may indicate that the MKA server 210 is able to both receive data from the MKA client 220 and transmit data to the MKA client 220 using the second SAK, but that the MKA server 210 is now unable to both receive data from the MKA client 220 and transmit data to the MKA client 220 using the first SAK. In other words, the third message may indicate that the first SAK is false or invalid for both the transmit and receive directions, and the second SAK is true or valid for both the transmit and receive directions.

In another operation 242, the MKA client 220 may transmit a fourth message to the MKA server 210. The fourth message may indicate that the MKA client 220 will transmit data to the MKA server 210 and receive data from the MKA server 210 using the second SAK, and that the MKA client will not transmit data to the MKA server 210 and receive data from the MKA server 210 using the first SAK. In one example, the fourth message may be an optional message that confirms the MKA client 220, at that current time, is exclusively using the second SAK and is no longer using the first SAK.

In one example, the first message, the second message, the third message and the fourth message may each indicate the first SAK, the second SAK, and corresponding validity or invalidity indications for the first SAK and the second SAK in a specific transmit or receive direction.

In another example, the MKA server 210 and the MKA client 220 may transition from use of the first SAK to use of the second SAK based on the first message, the second message and the third message communicated between the MKA server 210 and the MKA client 220. In other words, based on three messages, the MKA server 210 and the MKA client 220 may transition from using the first SAK, using both the first SAK and the second SAK, and then finally using the second SAK but not the first SAK when communicating data between the MKA server 210 and the MKA client 220.

The three messages used to transition between the first SAK and the second SAK may be a reduced number of messages, as compared to previous solutions, based on the MKA server 210 and the MKA client 220 operating in a two-device communication channel or two-device communication system. In other words, a SAK distribution for the two-device communication channel or system may involve the reduced number of messages, as compared to the previous solutions where the SAK distribution would occur with multiple clients in a multi-device communication channel or system, thereby leading to an increased amount of signaling or messaging between the entities of the multi-device communication channel or system.

Figure 3:
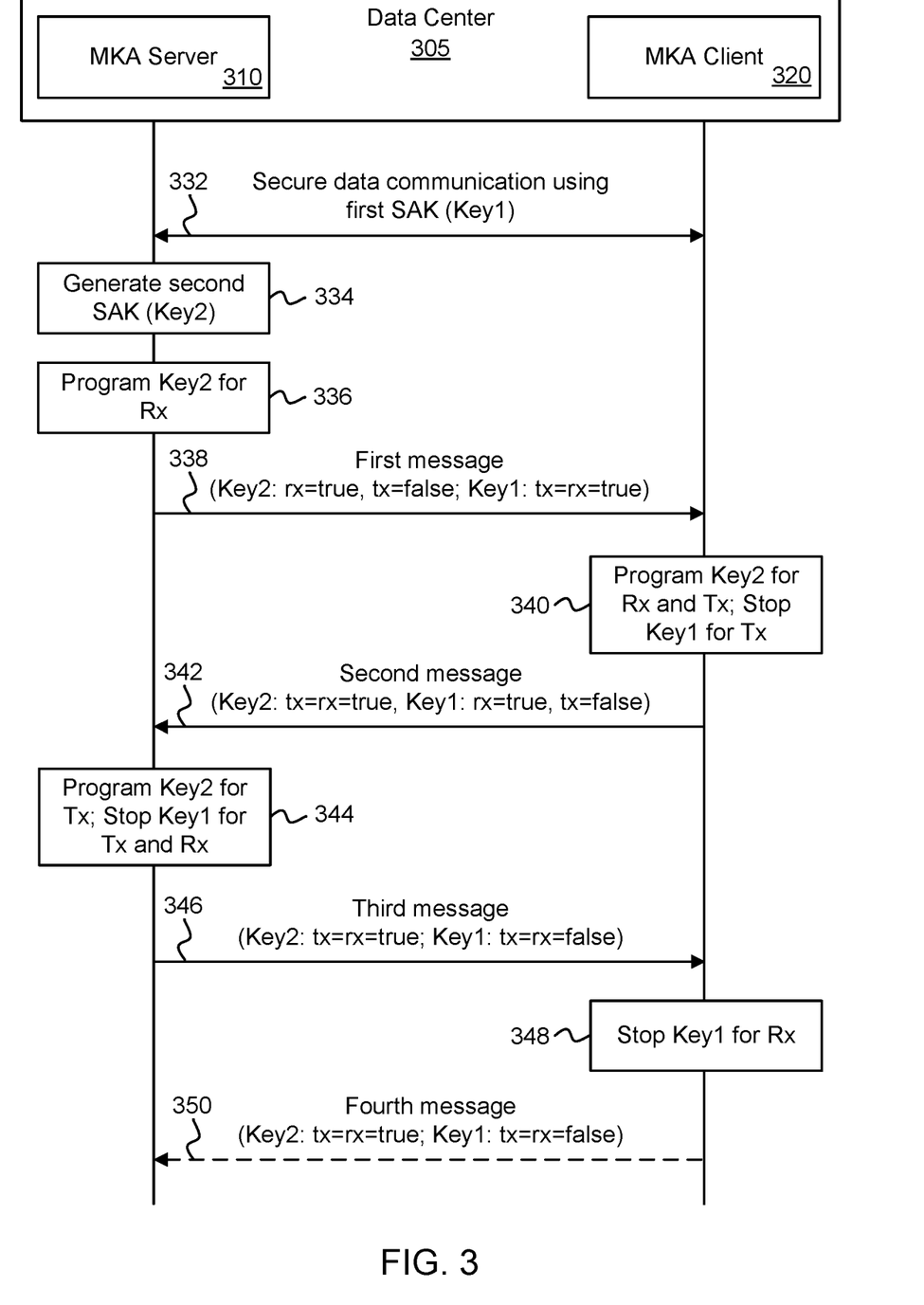
FIG. 3 illustrates operations for programming a second SAK and stopping use of a first SAK at an MKA server and an MKA client when transitioning from use of the first SAK to the second SAK according to an example of the present technology.

FIG. 3 illustrates an example of operations for programming a second SAK (Key2) and stopping use of a first SAK (Key1) at an MKA server 310 and an MKA client 320 in a data center 305 when transitioning from use of the first SAK to the second SAK. In an initial action 332, the MKA server 310 and the MKA client 320 may communicate using the first SAK. In another action 334, the MKA server 310 may identify or generate the second SAK. In a further action 336, the MKA server 310 may program or store the second SAK for use in a receive direction in a hardware device (e.g., a memory device) of the MKA server 310. In one operation 338, the MKA server 310 may transmit a first message to the MKA client 320.

In a further operation 340, after the first message has been received at the MKA client 320, the MKA client 320 may program or store the second SAK for use in both a receive and a transmit direction in a hardware device of the MKA client 320. Further, the MKA client 320 may stop using the first SAK with respect to a transmit direction. At this point, the MKA client 320 may be unable to transmit data using the first SAK. In an additional action 342, the MKA client 320 may transmit a second message to the MKA server 310. In action 344, the MKA server 310 may program the second SAK for use in a transmit direction in the hardware device of the MKA server 310. Further, the MKA server 310 may stop using the first SAK with respect to both the transmit and receive directions. At this point, the MKA server 310 may be unable to both transmit and receive data using the first SAK. After the first SAK stops being used for transmitting and receiving data, the first SAK may be removed or erased from the hardware device of the MKA client 320.

In action 346, the MKA server 310 may transmit a third message to the MKA client 320. In action 348, after the third message has been received at the MKA client 320, the MKA client 320 may stop using the first SAK with respect to a receive direction from the hardware device of the MKA client 320. At this point, the second SAK may be programmed or stored at both the MKA server 310 and the MKA client 320 with respect to both the transmit and receive directions, and the first SAK may be not be used by both the MKA server 310 and the MKA client 320 with respect to both the transmit and receive directions. In action 350, the MKA client 320 may transmit a fourth message to the MKA server 310 as a confirmation or acknowledgement to the third message received at the MKA client 320.

Figure 4:
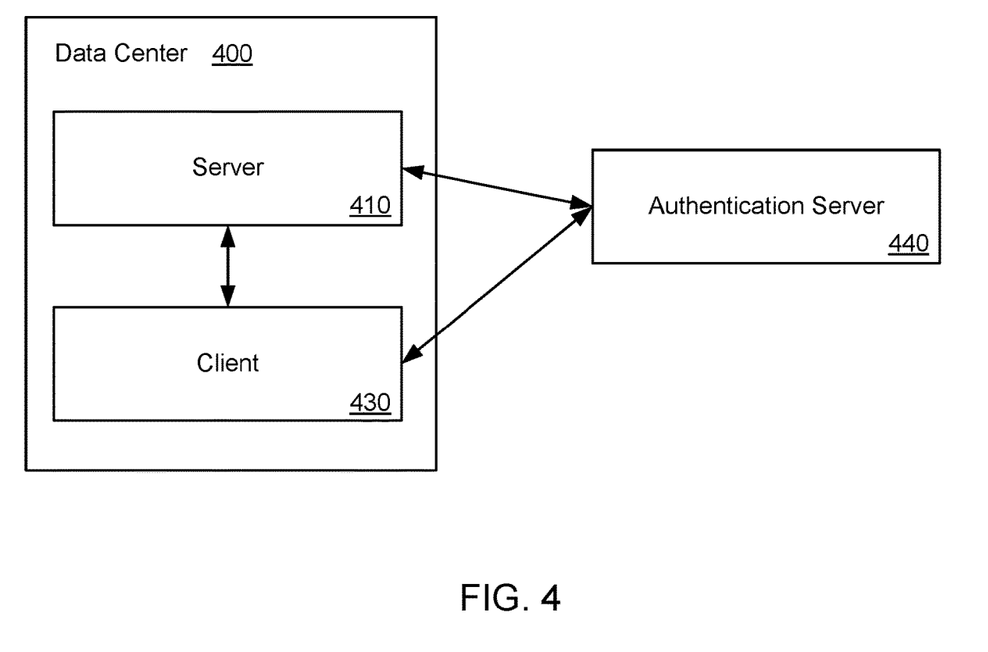
FIG. 4 illustrates a system and related operations for authenticating a server and a client in a data center using an authentication server according to an example of the present technology.

FIG. 4 illustrates an example of a system and related operations for authenticating a server 410 and a client 430 in a data center 400 using an authentication server 440. The authentication server 440 may be included in the data center 400, or alternatively, the authentication server 400 may be included in a service provider environment that is external to the data center 400. As an example, the authentication server 440 may facilitate an authentication procedure between the server 410 and the client 430. The authentication procedure may enable the server 410 and the client 430 to communicate with each other. In a specific example, the authentication server 440 may authenticate the server 410 and the client 430 using MKA. After completion of the authentication procedure, the server 410 and the client 430 may communicate directly with each other. For example, after the server 410 and the client 430 are authenticated using the authentication procedure, the server 410 and the client 430 may communicate with each other using a first security key, as described above with respect to FIGS. 1-3.

Figure 5A:
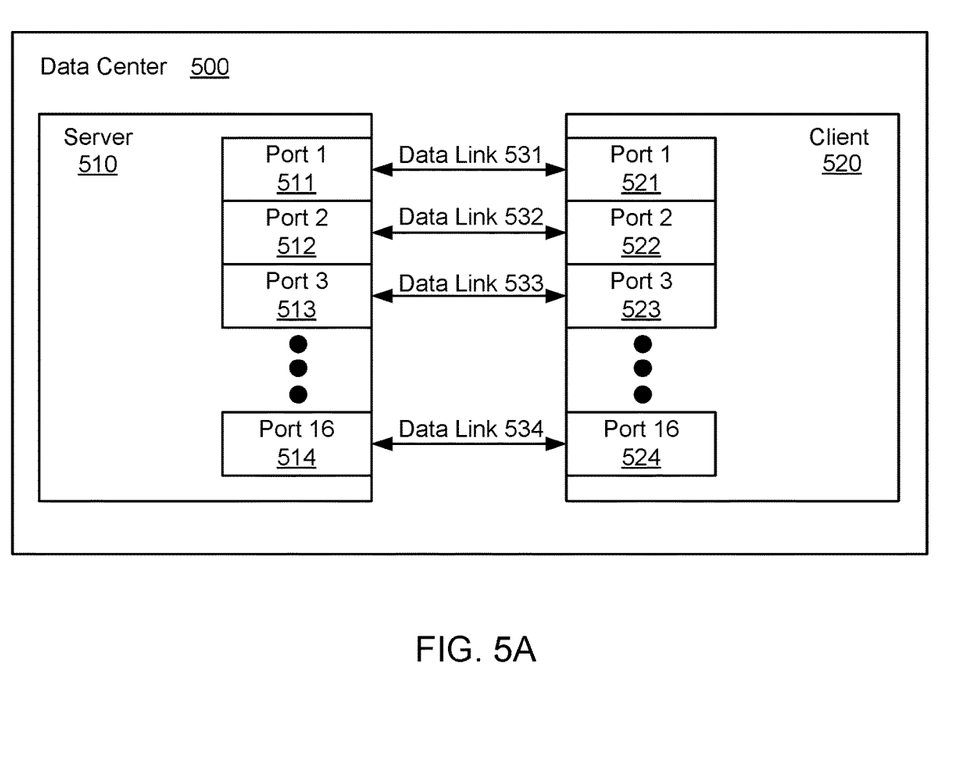
FIGS. 5A and 5B illustrate server and client configurations in a data center according to an example of the present technology.

FIGS. 5A and 5B illustrate examples of server and client configurations in a data center 500. As shown in FIG. 5A, a server 510 in the data center 500 may include 16 ports, including a first port 511, a second port 512, a third port 513 up to a sixteenth port 514. A client 520 in the data center 500 may also include 16 ports, including a first port 521, a second port 522, a third port 523 up to a sixteenth port 524. In the configuration shown in FIG. 5A, the first port 511 of the server 510 may be connected to the first port 521 of the client 520 via a data link 531, the second port 512 of the server 510 may be connected to the second port 522 of the client 520 via a data link 532, and the third port 513 of the server 510 may be connected to the third port 523 of the client 520 via a data link 533, etc.

Figure 5B:
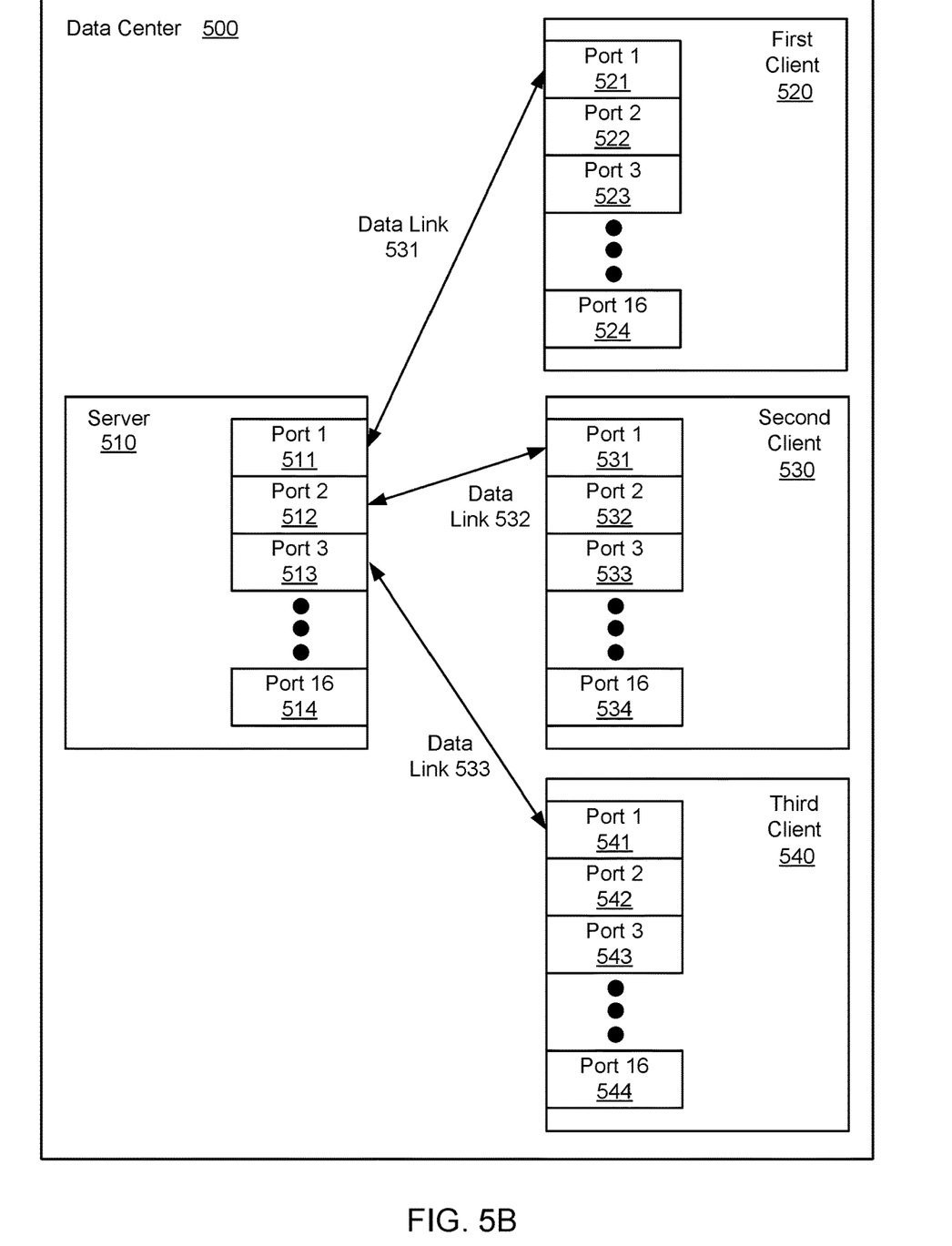

In FIG. 5B, the server 510 may communicate with the client 520 (also referred to as a first client 520), a second client 530 and a third client 540. The second client 530 may include 16 ports, including a first port 531, a second port 532, a third port 533 up to a sixteenth port 534. The third client 540 may include 16 ports, including a first port 541, a second port 542, a third port 543 up to a sixteenth port 544. In the configuration shown in FIG. 5B, the first port 511 of the server 510 may be connected to the first port 521 of the first client 520 via the data link 531, the second port 512 of the server 510 may be connected to the first port 531 of the second client 530 via the data link 532, and the third port 513 of the server 510 may be connected to the first port 541 of the third client 540 via the data link 533.

The data link 531, the data link 532 and the data link 533 may each have a separate or independent security mechanism as compared to the other data links. In other words, a security key distribution for the data link 531 may be separate or independent of a security key distribution for the data link 532 and the data link 533, and so on. The security key distribution for each of the data link 531, the data link 532 and the data link 533 between the server 510 and the first client 520, the second client 530 and/or the third client 540 may be independently performed by transitioning from a first security key to a second security key, as described above with respect to FIGS. 1-3.

Figure 6:
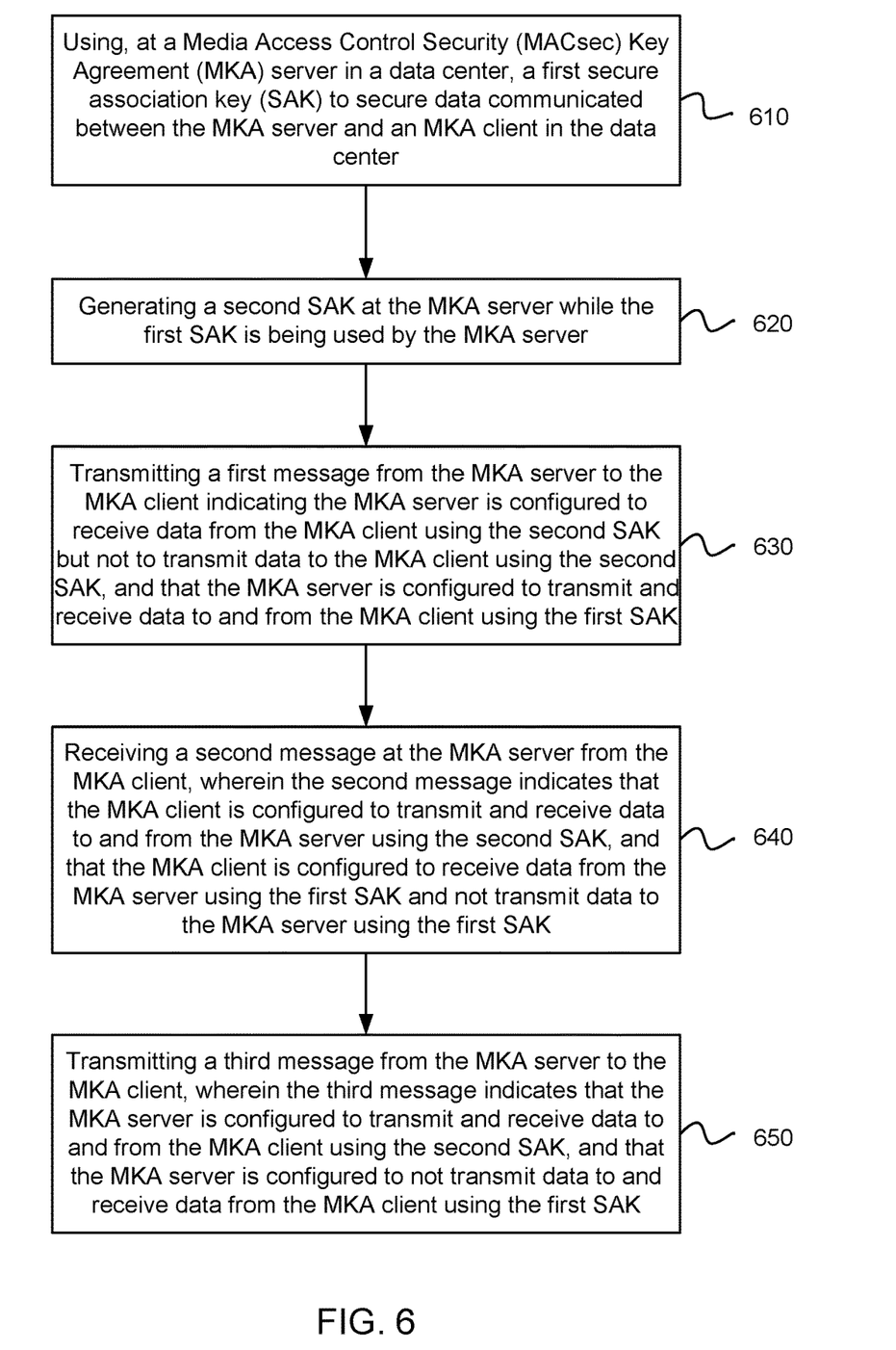
FIG. 6 is a flowchart of an example method for transitioning from use of a first SAK to a second SAK to secure data communications between an MKA server and an MKA client.

FIG. 6 illustrates an example of a method for transitioning from use of a first SAK to a second SAK to secure data communications between an MKA server and an MKA client. In one example, the MKA server may include up to 16 ports and the MKA client may include up to 16 ports. A data link may be connected between a port of the MKA server and a port of the MKA client (i.e., a port-to-port link). Security of the port-to-port link between the MKA server and the MKA client may be independent of security of other port-to-port links at the MKA server.

The first SAK may be used by the MKA server in the data center to secure data communication between the MKA server and the MKA client in the data center, as in block 610. For example, the first SAK may have been previously exchanged and established between the MKA server and the MKA client.

A second SAK may be generated at the MKA server while the first SAK is being used by the MKA server, as in block 620. The second SAK may be generated after the first SAK has been in use for a certain duration of time (e.g., 30 seconds). For example, the generation of the second SAK may be triggered automatically based on the duration of time.

A first message including the second SAK may be transmitted from the MKA server to the MKA client, as in block 630. The first message may indicate the MKA server is configured to receive data from the MKA client using the second SAK but the MKA server will not transmit data to the MKA client using the second SAK. Further, the first message may indicate that the MKA server is configured to transmit data to and receive data from the MKA client using the first SAK.

A second message may be received at the MKA server from the MKA client, as in block 440. The second message may indicate that the MKA client is configured to transmit data to and receive data from the MKA server using the second SAK, as in block 640. Further, the second message may indicate that the MKA client is configured to receive data from the MKA server using the first SAK and the MKA client will not transmit data to the MKA server using the first SAK.

A third message may be transmitted from the MKA server to the MKA client, as in block 650. The third message may indicate that the MKA server is configured to transmit data to and receive data from the MKA client using the second SAK. Further, the third message may indicate that the MKA server is configured to not transmit data to and receive data from the MKA client using the first SAK.

In one example, a fourth message may be received at the MKA server from the MKA client. The fourth message may confirm that the MKA client is not using the first SAK to transmit data to and receive data from the MKA server.

In one example, the MKA server and the MKA client may transition from use of the first SAK to the second SAK to secure data communicated between the MKA server and the MKA client using a reduced amount of signaling between the MKA server and the MKA client based on the MKA server and the MKA client operating in a two-device communication channel. In another example, the MKA server and the MKA client may switch between the first SAK and the second SAK at a reduced time interval due to the reduced amount of signaling between the MKA server and the MKA client.

Figure 7:
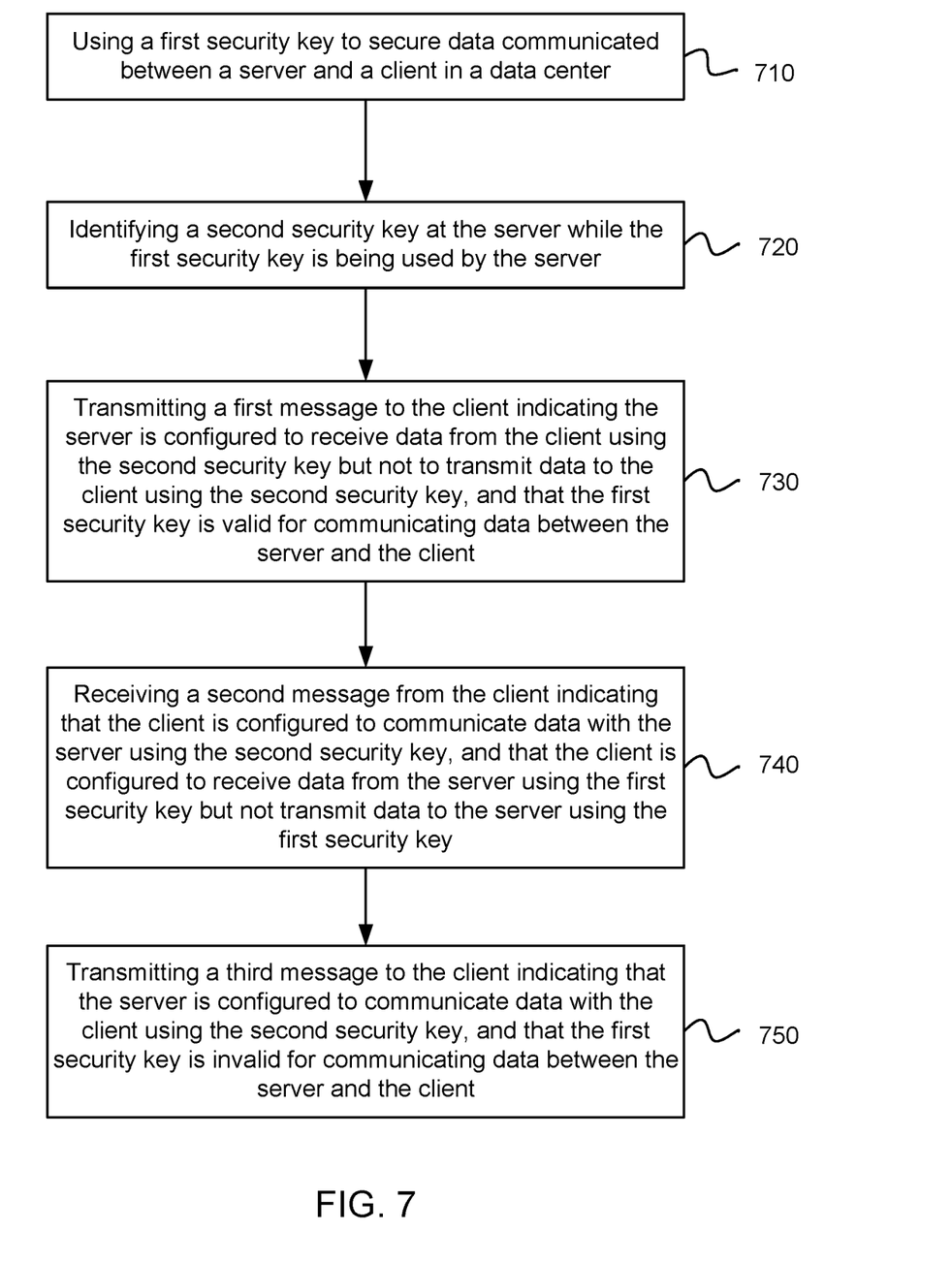
FIG. 7 is a flowchart of an example method for transitioning from use of a first security key to a second security key to secure data communications between a server and a client in, for example, a data center.

FIG. 7 illustrates an example of a method for transitioning from use of a first security key to a second security key to secure data communications between a server and a client in a data center. In one example, the server may be a network device in the data center and the client may be a compute server in the data center. In a further example, the server may be a MAK server and the client may be a MAK client in accordance with a MACsec protocol. In yet a further example, the first security key and the second security key may be SAKs in accordance with the MACsec protocol.

In one example, the server and the client may each have up to 16 ports. Security of a port-to-port link between the server and the client may be independent of security of other port-to-port links at the server. As a non-limiting example, the port-to-port link between the server and the client may be a 100 gigabit or greater wired Ethernet link.

A first security key may be used to secure data communicated between a server and a client in a data center, as in block 710. For example, the first security key may have been previously exchanged and established between the server and the client. The first security key may be used to prevent security threats, such as denial of service, intrusion, man-in-the-middle attacks, masquerading, passive wiretapping, playback attacks, etc.

A second security key may be identified at the server while the first security key is being used by the server, as in block 720. The second security key may be programmed to a hardware device of the server after the second security key is identified or generated, thereby enabling a first message to be transmitted to the client to indicate that the server is configured to receive data from the client using the second security key.

The first message may be transmitted to the client, as in block 730. The first message may indicate the server is configured to receive data from the client using the second security key but the server is not ready to transmit data to the client using the second security key. The first message may indicate that the first security key is valid for communicating data between the server and the client. The transmission of the first message may enable the client to program the second security key to a hardware device of the client. For example, the second security key may be programmed at the client to enable the client to send and receive data with the server using the second security key.

A second message may be received from the client, as in block 740. The second message may indicate the client is configured to communicate data with the server using the second security key. Further, the second message may indicate the client is configured to receive data from the server using the first security key but not configured to transmit data to the server using the first security key. In one example, the second message may indicate that the client is configured to receive data from the server using the first security key in order to be able to receive packets that are in-flight between the server and the client.

A third message may be transmitted to the client, as in block 750. The third message may indicate the server is configured to communicate data with the client using the second security key. The third message may also indicate the first security key is invalid for communicating data between the server and the client. In one example, a fourth optional message may be received from the client, where the fourth message may confirm that the client is not using the first security key to transmit data to and receive data from the server.

Figure 8:
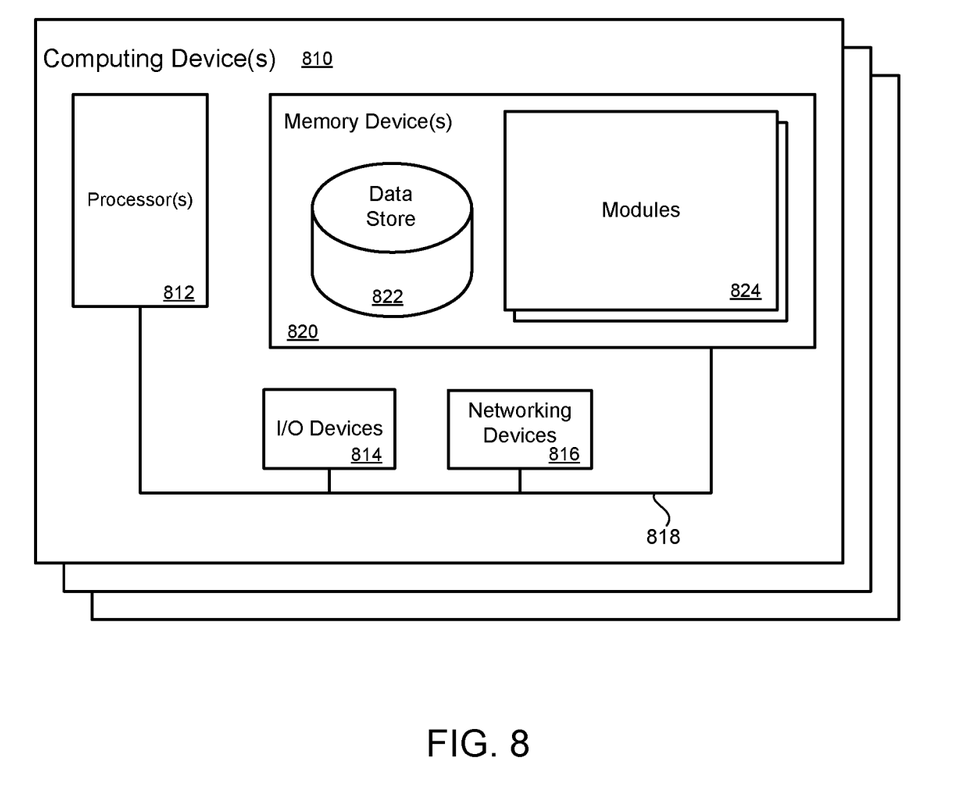
FIG. 8 is a block diagram that provides an example illustration of a computing device that may be employed in the present technology.

FIG. 8 illustrates a computing device 810 on which various functionalities of this technology may execute. The computing device 810 is illustrated on which a high level example of the technology may be executed. The computing device 810 may include one or more processors 812 that are in communication with memory devices 820. The computing device may include a local communication interface 818 for the components in the computing device. For example, the local communication interface may be a local data bus and/or any related address or control busses as may be desired.

The memory device 820 may contain modules 824 that are executable by the processor(s) 812 and data for the modules 824. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen that is available to display output from the computing devices. Other known I/O device may be used with the computing device as desired. Networking devices 816 and similar communication devices may be included in the computing device. The networking devices 816 may be wired or wireless networking devices that connect to the internet, a local area network (LAN), wide area network (WAN), or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom Very Large Scale Integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, electrically erasable programmable read-only memory (EEPROM), flash memory or other memory technology, compact disc read-only memory (CD-ROM), digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A non-transitory machine readable storage medium having instructions embodied thereon, wherein the instructions when executed by one or more processors, cause the one or more processors to perform a process including:
   using, at a Media Access Control Security (MACsec) Key Agreement (MKA) server in a data center, a first secure association key (SAK) to secure data communicated over a network link between the MKA server and an MKA client in the data center;
   generating a second SAK at the MKA server while the first SAK is being used by the MKA server;
   transmitting a first message from the MKA server to the MKA client indicating the MKA server is configured to receive data from the MKA client using the second SAK but is not configured to transmit data to the MKA client using the second SAK, and that the MKA server is configured to transmit data to and receive data from the MKA client using the first SAK;
   receiving a second message at the MKA server from the MKA client, wherein the second message indicates that the MKA client is configured to transmit data to and receive data from the MKA server using the second SAK, and that the MKA client is configured to receive data from the MKA server using the first SAK and is not configured to transmit data to the MKA server using the first SAK; and
   transmitting a third message from the MKA server to the MKA client, wherein the third message indicates that the MKA server is configured to transmit data to and receive data from the MKA client using the second SAK, and that the MKA server is configured to not transmit data to and receive data from the MKA client using the first SAK.

2. The non-transitory machine readable storage medium of claim 1, the process further including: receiving a fourth message from the MKA client, wherein the fourth message confirms that the MKA client is not using the first SAK to transmit data to and receive data from the MKA server.

3. The non-transitory machine readable storage medium of claim 1, the process further including:
   transitioning from use of the first SAK to the second SAK to secure data communicated between the MKA server and the MKA client using a reduced amount of signaling between the MKA server and the MKA client based on the MKA server and the MKA client operating in a two-device communication channel as compared to a multi-device communication channel.

4. The non-transitory machine readable storage medium of claim 1, the process further including: switching between the first SAK and the second SAK in a reduced time interval based on the MKA server and the MKA client operating in a two-device communication channel as compared to a multi-device communication channel.

5. The non-transitory machine readable storage medium of claim 1, wherein the MKA server and the MKA client each have a plurality of ports, and security of a port-to-port link between the MKA server and the MKA client is independent of security of other port-to-port links at the MKA server.

6. A method, using one or more processors, comprising:
   using a first security key to secure data communicated over a network link between a server and a client;
   identifying a second security key at the server while the first security key is being used by the server;

transmitting a first message to the client indicating the server is configured to receive data from the client using the second security key but not to transmit data to the client using the second security key, and that the first security key is valid for sending and receiving data between the server and the client;

receiving a second message from the client indicating that the client is configured to send and receive data with the server using the second security key, and that the client is configured to receive data from the server using the first security key but not transmit data to the server using the first security key; and transmitting a third message to the client indicating that the server is configured to send and receive data with the client using the second security key, and that the first security key is invalid for sending and receiving data between the server and the client.

7. The method of claim 6, further comprising: transitioning from use of the first security key to the second security key to secure data communicated between the server and the client using a reduced amount of signaling between the server and the client based on the server and the client operating in a two-device communication channel as compared to a multi-device communication channel.

8. The method of claim 7, further comprising: receiving a fourth message from the client, wherein the fourth message confirms that the client is not using the first security key to transmit data to or receive data from the server.

9. The method of claim 7, further comprising: programming the second security key to a hardware device of the server after the second security key is generated, thereby enabling the first message transmitted to the client to indicate that the server is configured to receive data from the client using the second security key.

10. The method of claim 7, wherein the second message indicates that the client is configured to receive data from the server using the first security key in order to be able to receive packets that are in-flight between the server and the client.

11. The method of claim 6, further comprising: transmitting the first message to enable the client to program the second security key to a hardware device of the client, wherein the second security key is programmed at the client to enable the client to send and receive data with the server using the second security key.

12. The method of claim 6, wherein the server and the client each have a plurality of ports, and wherein security of a port-to-port link between the server and the client is independent of security of other port-to-port links at the server.

13. The method of claim 6, wherein a port-to-port link between the server and the client is at least a 100 gigabit wired Ethernet link.

14. The method of claim 6, wherein the server is a Media Access Control Security (MACsec) Key Agreement (MKA) server and the client is an MKA client in accordance with a MACsec protocol.

15. The method of claim 6, wherein the first security key and the second security key are secure association keys (SAKs) in accordance with a Media Access Control Security (MACsec) protocol.

16. The method of claim 6, wherein the server is a network device in a data center and the client is a compute server in the data center.

17. A system, comprising:
at least one processor; and
at least one memory device including a data store to store a plurality of data elements and instructions that, when executed, cause the system to:
use, at a client, a first security key to secure data communicated between the client and a server in the data center;
receive a first message at the client from the server indicating the server is configured to receive data from the client using a second security key and is not configured transmit data to the client using the second security key, and that the server is configured to transmit data to and receive data from the client using the first security key;
transmit a second message from the client to the server, wherein the second message indicates that the client is configured to transmit data to and receive data from the server using the second security key, and that the client is configured to receive data from the server using the first security key and not transmit data to the server using the first security key;
receive a third message at the client from the server that the server is configured to transmit data to and receive data from the client using the second security key, and that the server is configured to not transmit data to and receive data from the client using the first security key; and
transmit a fourth message from the client to the server, wherein the fourth message confirms that the client is not using the first security key to transmit data to and receive data from the server.

18. The system of claim 17, wherein the plurality of data elements and instructions, when executed, cause the system to: transition from use of the first security key to the second security key to secure data communicated between the client and the server using a reduced amount of signaling between the client and the server based on the server operating in a two-device communication channel as compared to a multi-device communication channel.

19. The system of claim 17, wherein the server is a Media Access Control Security (MACsec) Key Agreement (MKA) server and the client is an MKA client in accordance with a MACsec protocol.

20. The system of claim 17, wherein the first security key and the second security key are secure association keys (SAKs) in accordance with a Media Access Control Security (MACsec) protocol.

* * * * *